United States Patent [19]

Fukatsu et al.

[11] Patent Number: 5,034,827
[45] Date of Patent: Jul. 23, 1991

[54] VIDEO SIGNAL PROCESSING APPARATUS WITH MEMORY READ/WRITE TIMING RELATED TO HORIZONTAL SCANNING PERIOD

[75] Inventors: Tsutomu Fukatsu; Yoshihiro Nakatani, both of Kanagawa, Japan

[73] Assignee: Canon Kabushiki Kaisha, Tokyo, Japan

[21] Appl. No.: 209,274

[22] Filed: Jun. 20, 1988

[30] Foreign Application Priority Data

Jun. 30, 1987 [JP] Japan .............................. 62-164816
Jun. 30, 1987 [JP] Japan .............................. 62-164819

[51] Int. Cl.⁵ .............................................. H04N 5/94
[52] U.S. Cl. ................................... 360/10.3; 360/38.1
[58] Field of Search .............. 358/328, 339, 335, 213, 358/26, 138, 312, 314; 360/35.1, 38.1, 9.1, 10.1, 10.3, 33.1

[56] References Cited

U.S. PATENT DOCUMENTS

| | | | |
|---|---|---|---|
| 4,007,486 | 2/1977 | Inaba | 358/324 |
| 4,058,840 | 11/1977 | Kasprzak | 360/35.1 |
| 4,210,938 | 7/1980 | Heitmann et al. | 360/10.3 |
| 4,293,879 | 10/1981 | Heitmann et al. | 360/10.3 |
| 4,680,658 | 7/1987 | Tatami | 360/38.1 |
| 4,733,312 | 3/1988 | Morimoto | 360/38.1 |
| 4,785,359 | 11/1988 | Hickok | 360/9.1 |
| 4,788,604 | 11/1988 | Takeuchi | 358/339 |
| 4,802,025 | 1/1989 | Shinada | 358/339 |

*Primary Examiner*—Donald McElheny, Jr.
*Attorney, Agent, or Firm*—Robin, Blecker, Daley & Driscoll

[57] ABSTRACT

An apparatus for processing a video signal reproduced by a reproducing head from a recording medium, on which the video signal is recorded in many parallel tracks and reproduced with the head tracing the tracks athwart, is provided with a memory which is capable of storing one field portion of the video signal. The apparatus is arranged to alternately perform writing of the video signal reproduced by the reproducing head into the memory and reading of the stored signal from the memory in a cycle of periods shorter than one field period. Each of the writing and reading periods is set at a length of time which is an integer times as long as the horizontal scanning period of the video signal.

9 Claims, 8 Drawing Sheets

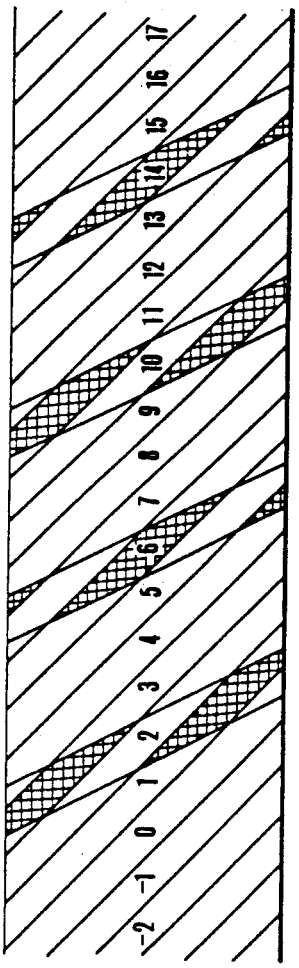
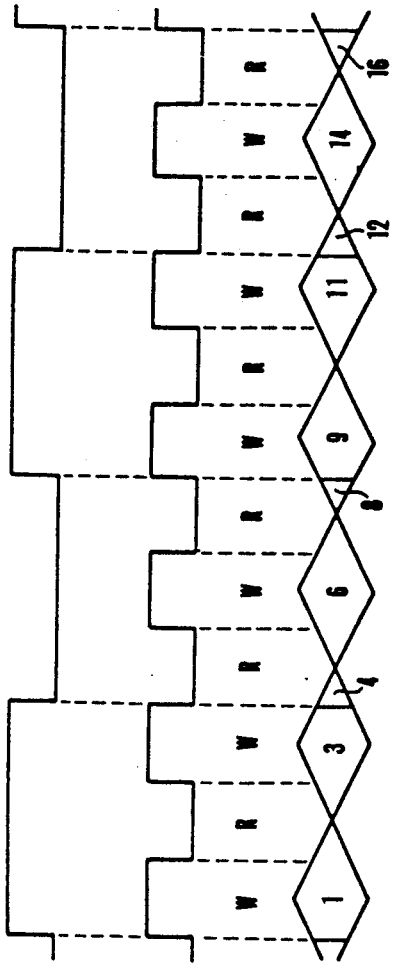
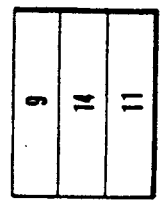
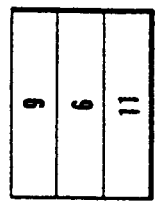
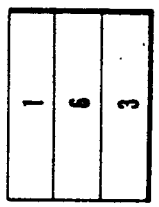
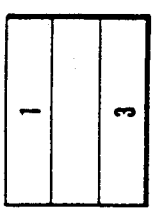
FIG.1(a)
FIG.1(b)
FIG.1(c)
FIG.1(d)
FIG.1(e)
PRIOR ART

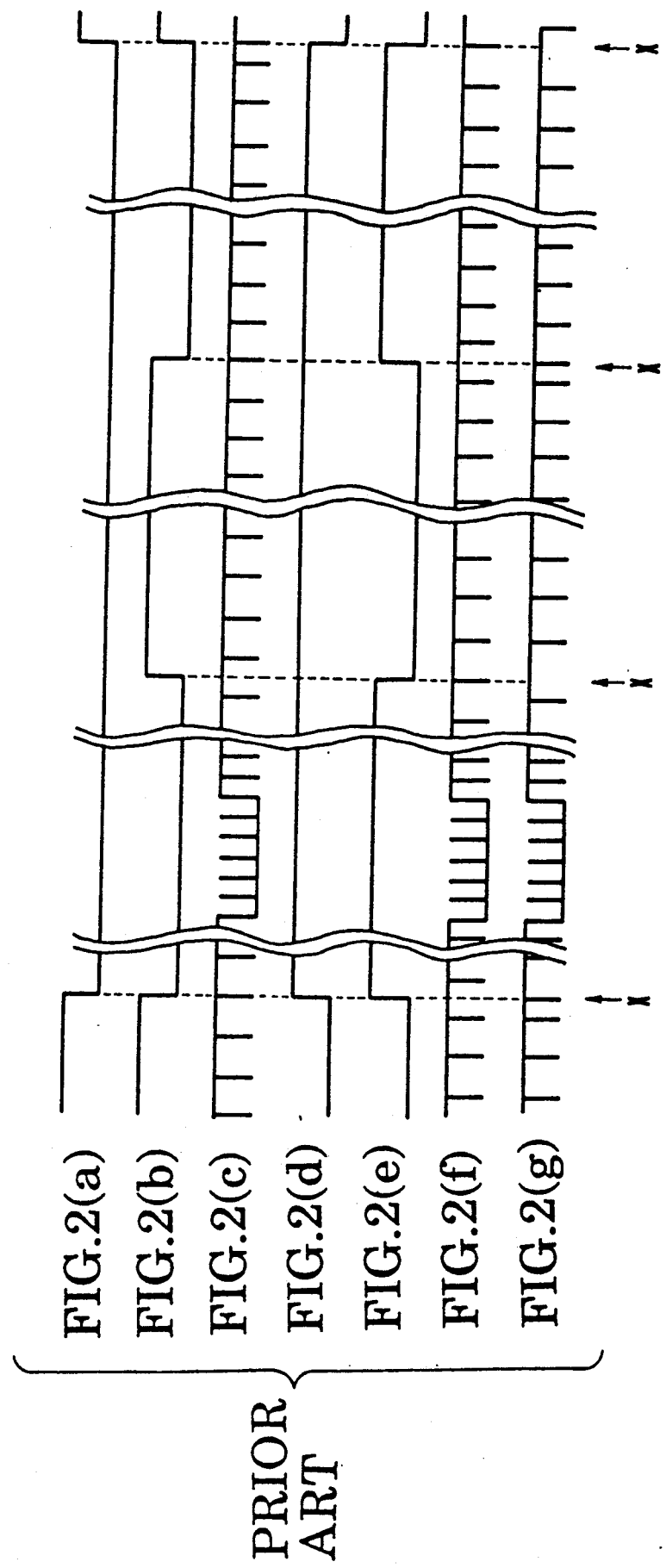

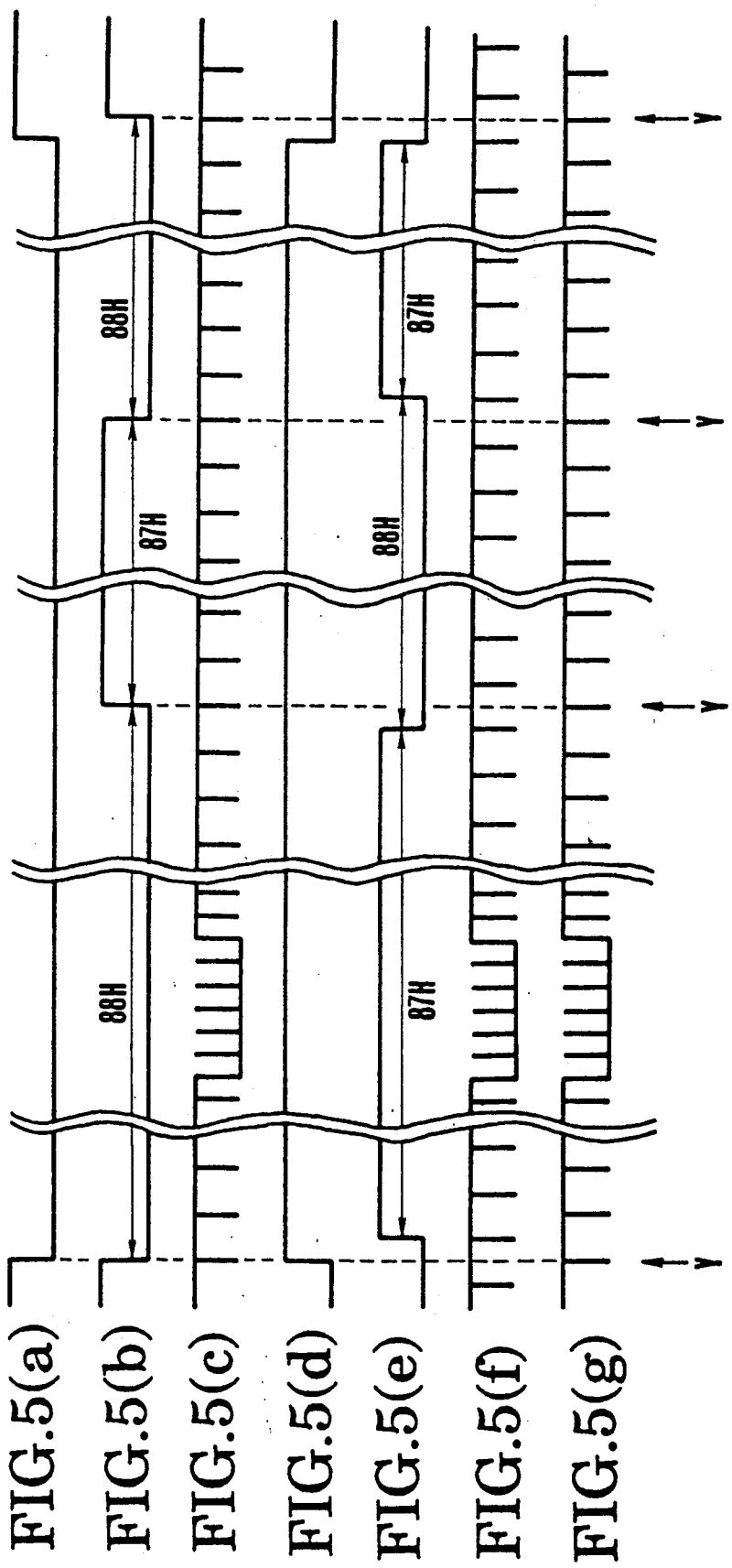

VIDEO SIGNAL PROCESSING APPARATUS WITH MEMORY READ/WRITE TIMING RELATED TO HORIZONTAL SCANNING PERIOD

BACKGROUND OF THE INVENTION

1. Field of the Invention

This invention relates to a video signal processing apparatus and more particularly to a video signal processing apparatus having a memory which is capable of storing one field portion of a video signal.

2. Description of the Related Art

Among the apparatuses of the above stated kind, a helical scanning type video tape recorder having a so-called high speed search reproduction function (hereinafter referred to as VTR) is popularly known. The following description, therefore, takes up by way of example the VTR of that type.

The VTR is generally arranged to have different azimuth angles for adjacent recording tracks for the purpose of minimizing a cross-talk between the tracks. Therefore, in cases where a rotary head of the VTR is caused to trace the surface of a tape in the direction of intersecting the tracks by allowing the tape to travel at a high speed, it is impossible to obtain any reproduced signal from one of the adjacent tracks. The reproduction output obtained during such a period, therefore, deteriorates and thus causes noise bars to appear on a reproduction image plane.

In one solution of this problem, a pair of heads differing in azimuth angle from each other are adjacently disposed. For example, two pairs of such heads are arranged to revolve at a phase difference of 180 degrees. The noise bars in question is prevented from showing by allowing one of each pair of heads which has the same azimuth angle as that of the currently traced track to produce a reproduced signal.

In another solution, the VTR is provided with a memory which is capable of storing one field portion of a video signal. The memory is arranged to store, during high speed search reproduction, the video signal only when the reproduction output thereof is not deteriorated. When the reproduction output is deteriorated, the deteriorated part of the reproduced video signal is replaced with a corresponding part of the reproduced image plane previously stored in the memory, and such corresponding part is read out. In the case of this method, one field portion of the video signal stored in the memory is obtained by tracing the tape with a rotary head several times. Therefore, in cases where one and the same part of the video signal on the reproduced image plane happens to be continuously deteriorated over a long period of time, the video signal stored in the memory is not renewed for a long period of time. Then, an undeteriorated part of a reproduced signal and the long-time-unrenewed part would become hardly matchable with each other. This would result in a very unnatural reproduced picture.

In view of this, it has been considered to make the travelling speed of the tape an even number times as high as the tape speed employed in recording in case that the above stated memory is used. In this case, the VTR having two heads operates in the following manner: FIGS. 1(a) to 1(e) of the accompanying drawings show this operation. FIG. 1(a) shows the tracing loci of the heads on the tape obtained during reproduction at a tape speed four times as high as the recording tape speed. In FIG. 1(a), crosshatching denotes parts where a reproduced signal is obtained. Reference numerals represent track numbers, i.e. field numbers. FIG. 1(b) shows a head change-over pulse. FIG. 1(c) shows a writing/reading switching pulse for a memory. FIG. 1(d) shows the envelope wave form of the reproduced signal.

The reference numerals of FIG. 1(d) represent field numbers corresponding to those of FIG. 1(a). FIG. 1(e) shows field numbers of images displayed in varied parts of a reproduced image plane. No unnatural image will be displayed as the image is completely renewed in a cycle of two fields.

However, the above stated arrangement of using paired heads requires use of four heads with each pair of them adjacently disposed in the case of a two-head helical scanning type VTR. This necessitates a complex head arrangement. Further, the increase in the number of heads causes the rotary transmitter of the VTR to have many channels. Then, cross-talks between channels increase, and hence this head arrangement has been hardly applicable to a rotary head drum of a small diameter.

In the case of the method of using the memory, there has been the following problem: A rectangular wave signal (hereinafter referred to as 30 PG signal) having two field periods (30 Hz) is obtained by detecting the rotation phase of the rotary head. In the event of reproduction at a tape speed which is n times (n: an integer) as high as a tape speed used for recording, the 30 PG signal is generally stepped up by $|(n-1)|$ times by means of a PLL or the like and is used for switching between writing and reading actions on the memory. In the case of an interlaced scanning NTSC TV signal or the like, however, the phase of the horizontal synchronizing signal relative to the rotation phase of the rotary head obtained in the first field portion of the signal comes to shift as much as 0.5 horizontal scanning period (hereinafter referred to as H) in the second field portion of the signal. Further, a time-base variation taking place during reproduction causes the horizontal synchronizing signal to become incontinuous when the writing and reading actions on the memory are switched from one over to the other under the control of the above stated stepped up signal. This results in a skew and brings about some adverse effect on a reproduction image plane.

FIGS. 2(a) to 2(g) show in a timing chart the above stated switch-over between writing and reading actions performed on the memory by the conventional VTR. In the case of this illustration, tape is allowed to travel at a speed which is four times as high as the recording speed. FIGS. 2(a), 2(b) and 2(c) respectively show the signals obtained for the first field including the 30 PG signal, a writing/reading switching signal and a composite synchronizing signal included in the video signal. The writing action on the memory is arranged to be performed when the writing/reading switching signal is at low level and the reading action to be performed when this signal is at a high level. FIGS. 2(d), 2(e) and 2(f) likewise respectively show the signals obtained for the second field including the 30 PG signal, the writing/reading switching signal and the composite synchronizing signal. FIG. 2(g) shows a composite synchronizing signal included in the video signal obtained for the first field according to the above stated writing/reading switching signal. As shown, there take place skews at three parts X within one field.

In handling the so-called composite video signal which includes a carrier chrominance signal, switching between the writing and reading actions on the memory must be performed without impairing the continuity of the carrier chrominance signal. To meet this requirement, it has been considered to handle a digitized composite video signal by always handling each cycle of the carrier chrominance signal as one unit. For example, with a video signal sampling frequency assumed to be n fsc (wherein n represents an integer which is at least 3), an n number of sampled data are handled as one unit. However, this method is effective only in cases where the continuity of the color subcarrier of the original analog video signal is retained. It is impossible to ensure the continuity of the color subcarrier stored in the memory in cases where a plurality of video signals are to be written into the memory in a time sharing manner and to be read out from the memory; or where only the acceptable parts of a video signal in each field are to be incontinuously written into the memory during a high speed reproducing operation.

Therefore, in the case of storing in the memory a plurality of video signals being received at different timings as mentioned above, the conventional VTR is arranged to temporarily bring their carrier chrominance signals back into a plurality of base band signals such as color difference signals or the like and to store them separately in different memories. However, this arrangement has been undesirable as it necessitates the use of many discrete memories of large capacities for the luminance signal and two color difference signals,

SUMMARY OF THE INVENTION

This invention is directed to the solution of the above stated problems of the prior art.

It is therefore, an object of the invention to provide an apparatus which is capable of obtaining an adequate video signal having no skew by using a video signal read out from a memory.

It is another object of the invention to provide an apparatus which is capable of accomplishing high speed reproduction without causing any skew by using a memory.

Under this object, a video signal processing apparatus arranged as an embodiment of this invention comprises a memory capable of storing one field portion of a video signal; and switching means for changing the memory between a writing state and a reading state. The switching means is arranged to be capable of setting the memory alternately into the writing state and the reading state in a cycle which is shorter than one field period and also to be capable of setting each of periods of time for having the memory in the writing and reading states at a length that is an integer times as long as a horizontal scanning period.

It is a further object of the invention to provide a color video signal processing apparatus which is capable of preserving the continuity of a carrier chrominance signal stored in a memory.

Under that object, an apparatus arranged as another embodiment of this invention to process a digital signal obtained by sampling a color video signal at a frequency which is an n number (n: an integer which is at least 3) times as high as a color subcarrier frequency of the color video signal comprises an n number of memories; writing means for writing into the n number of memories an n number of consecutive samples of the digital signal, respectively; control clock signal forming means for forming a control clock signal which is of the same frequency as that of a color subcarrier of the color video signal and which is phase-locked to the color subcarrier; and timing control means for controlling a writing timing of the writing means on the basis of the control clock signal.

The above and other objects and features of the invention will become apparent from the following detailed description of embodiments thereof taken in connection with the accompanying drawings.

BRIEF DESCRIPTION OF THE DRAWINGS

FIGS. 1(a)–1(e) show a high speed search reproducing operation performed by using a memory. FIGS. 2(a)–2(g) are a timing chart showing the writing/reading switching action of the conventional apparatus. FIGS. 5(a) to 5(g) show in a timing chart the concept of the embodiment shown in FIG. 3.

DETAILED DESCRIPTION OF THE PREFERRED EMBODIMENTS

The following describes an embodiment of this invention, wherein the invention is applied to a VTR arranged to record and reproduce NTSC TV signals:

FIGS. 5(a) to 5(g) show in a timing chart the concept of the embodiment and correspond to FIGS. 2(a) to 2(g) respectively. In the case of this VTR, the address of each memory is arranged to be reset at intervals of a 263 H period for the first field and at intervals of a 262 H period for the second field. Further, a tape which is used as a recording medium is assumed to travel at a speed four times as high as the tape speed used in recording. The period of time for writing into the memory is assumed to be 88 H and the reading period to be 87 H.

Address resetting is thus always done in synchronism with a horizontal synchronizing signal. Therefore, the video signal stored in the same address area within the memory always has the horizontal synchronizing signal stored in the same position irrespective as to whether it is the first field portion or the second field portion of the video signal. In other words, even in case that the first field portion of the video signal and the second field portion of the video signal are to be alternately produced by repeating the writing and reading actions, the continuity of the horizontal synchronizing signal is retained. Referring to FIG. 5(g), the skew of 0.5 H which is shown in FIG. 1(g) never takes place even at the switch-over points Y between the writing and reading actions.

Further, since each of the writing period and the reading period is set at a value which is an integer times as much as the horizontal scanning period H, the writing and reading actions can be switched from one over to the other during a horizontal fly-back period which is outside of a reproduced image plane. Therefore, the reproduced image plane never clearly shows any discontinuance of the horizontal synchronizing signal that results from variations in the time base of a reproduced signal.

Further, the writing/reading switch-over timing of the first field does not coincide with that of the second field due to the address resetting in synchronism with the horizontal synchronizing signal. However, writing can be accomplished into the memory at every address thereof by arranging the writing period of time to be longer than the reading period. This arrangement ensures that no scanning line is skipped on the reproduced image plane.

Figure 3:
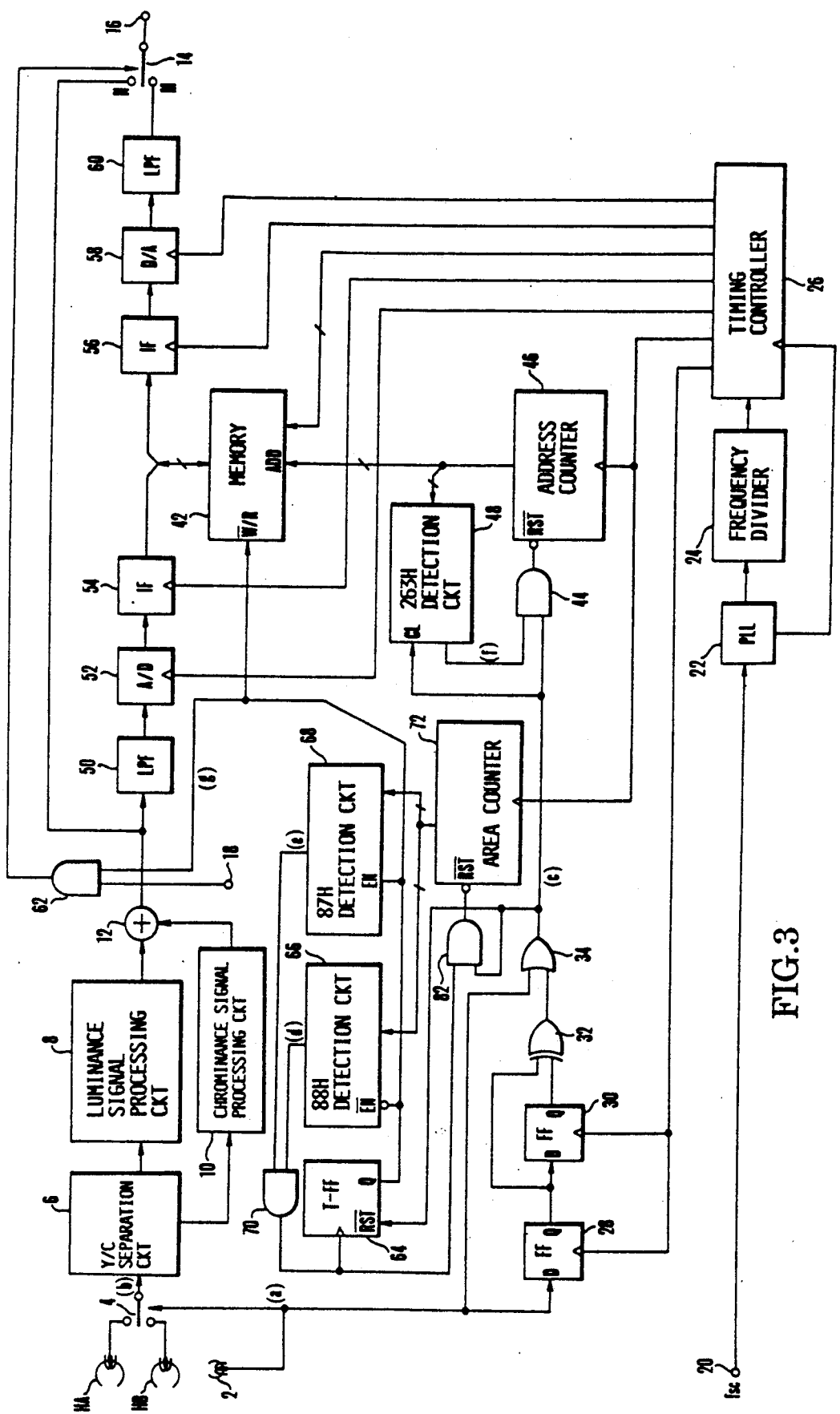
FIG. 3 is a diagram showing in outline the reproducing system of a VTR arranged as an embodiment of this invention.
Figures 4A, 4B, 4C, 4D, 4E, 4F, 4G:
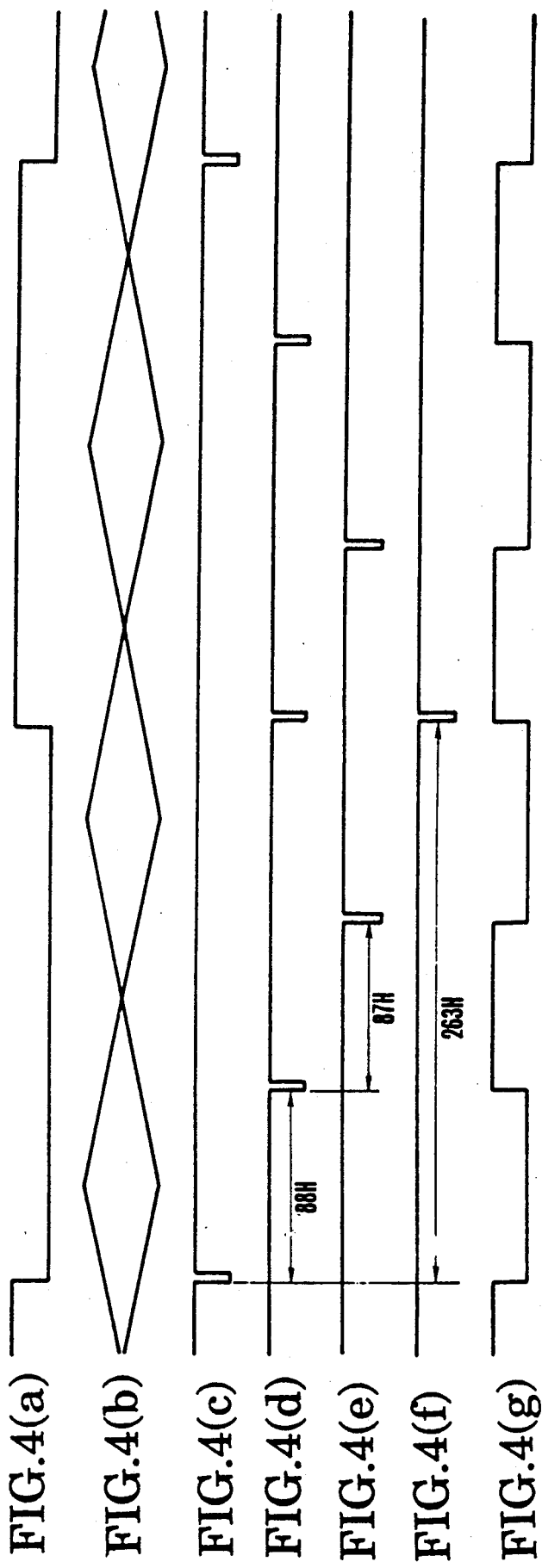
FIGS. 4(a) to 4(g) show in a timing chart the operations of various parts of FIG. 3.

FIG. 3 shows in outline the arrangement of the reproducing system of a VTR which embodies the above stated concept of the invention. FIGS. 4(a) to 4(g) show in a timing chart the operations of various parts of FIG. 3. A recording tape is wrapped at least 180 degrees round a rotary head cylinder. Heads HA and HB are arranged along the outer circumferential surface of the cylinder to revolve at a phase difference of 180 degrees from each other. These heads have different azimuth angles. Another head 2 is arranged to detect the rotation phase of the rotary heads HA and HB and to produce a rectangular wave signal of 30 Hz (hereinafter referred to as 30 PG signal) which is shown in FIG. 4(a). This 30 PG signal is of 30 Hz in case that the signal recorded on the tape is an NTSC TV signal. A head switch 4 is controlled by the 30 PG signal.

Under the control of the 30 PG signal, a reproduced video signal is continuously obtained from the head switch 4. The reproduced video signal is supplied to a Y/C separation circuit 6 which is arranged to separate the video signal into a frequency modulated luminance signal (hereinafter referred to as an FM-Y signal) and a low-band converted carrier chrominance signal (hereinafter referred to as a low-band C signal). The FM-Y signal is supplied to a luminance signal processing circuit 8 to be subjected to known processes such as frequency demodulation, etc. The low-band C signal is supplied to a chrominance signal processing circuit 10 to be subjected to various processes including frequency conversion, etc. A base-band luminance signal and a carrier chrominance signal which are thus obtained are supplied to a mixer 12 to be mixed together into a reproduced composite color video signal.

In performing a standard reproducing operation, an input signal which is supplied to a terminal 18 is at a low level. The output level of an AND gate 62 is also low. Therefore, the connecting position of a switch 14 is on one side N thereof to allow the output of the mixer 12 to be produced to an output terminal 16.

A high speed search reproducing operation is performed in the following manner. The terminal 18 is arranged to receive a signal the level of which becomes high when an instruction for a high speed search reproducing operation is given via an operation part (not shown). A terminal 20 is arranged to receive a clock signal of a color subcarrier frequency (hereinafter referred to as a frequency fsc) obtained from the chrominance signal processing circuit 10, etc. The clock signal thus received is supplied to a PLL 22 to have its frequency stepped up and to obtain a driving pulse which is applied to a timing controller 26. Meanwhile, the output of the PLL 22 is supplied to a frequency divider 24 to be frequency-divided to obtain a clock signal, which is also supplied to the timing controller 6. The timing controller 26 is arranged to control the operation timing of each of the various parts of the VTR.

Reference numerals 28 and 30 denote D-flip-flops (hereinafter referred to as D-FFs). The D-FF 28 is arranged to receive the above stated PG signal at the D terminal thereof. The D-FF 30 is arranged to receive the Q output of the D-FF 28 at its D terminal. To the clock terminals of the D-FFs 28 and 30 is supplied a clock signal of a sufficiently high frequency, such as the frequency fsc from the timing controller 26. The D-FF 30 produces from its $\overline{Q}$ terminal a pulse which is of a phase opposite to that of a pulse produced from the Q terminal of the D-FF 28 and which is delayed by 1/fsc from the latter. Therefore, when they are supplied to an exclusive OR circuit (hereinafter referred to as EXOR) 32, a pulse which is at a low level only at the edge parts of the 30 PG signal is obtained. The output of the EXOR 32 and the 30 PG signal are supplied to an OR gate 34 to obtain the logical sum of them. By this process a pulse which is at a low level only at the fall edge parts of the 30 PG signal thus having a two-field period as shown in FIG. 4(c) is obtained. Hereinafter, this pulse will be called a frame pulse.

For a high speed search operation, writing and reading actions on the memory and address control are performed as follows. The composite color video signal which is produced from the mixer 12 is supplied to a front low-pass filter (LPF) 50 to have its band limited thereby. After that, the composite color video signal is digitized by an analog-to-digital (A/D) converter 52. Input-output interfaces (hereinafter referred to as IFs) 54 and 56 are arranged to control the data transfer speed, the transfer timing, the mode, etc. of the memory 42. A digital-to-analog (D/A) converter 58 is arranged to convert the digital video signal produced from the IF 56 into an analog signal. A rear LPF 60 is arranged to remove the aliasing component of the output of the D/A converter 58. The A/D converter 52, the IFs 54 and 56 and the D/A converter 58 are arranged to operate under the control of the timing controller 26 respectively.

When the frame pulse is produced from the OR gate 34, an address counter 46 is reset through an AND gate 44. An area counter 72 is reset through an AND gate 82. Further, a T-flip-flop (hereinafter referred to as T-FF) 64 is also reset. The Q output of the T-FF 64 is, therefore, at a low level as shown in FIG. 4(g). Therefore, the memory 42 is first in a writing state. At that time, the input signal received at the terminal 18 is at a high level. However, since the output level of the T-FF 64 is low, the output of an AND gate 62 remains at a low level. Therefore, the connecting position of the switch 14 is on the side N thereof. Under this condition, a reproduced analog video signal which is obtained from a part where a large reproduction output is obtainable is produced from the terminal 16 as shown in FIG. 4(b).

Then, this analog video signal is digitized and stored at the memory 42. Further, since the Q output of the T-FF 64 is at a low level, the level of the enable terminal of an 88 H detection circuit 66 becomes low. The circuit 66 thus becomes operative. Meanwhile, an 87 H detection circuit 68 is in an inoperative state. The 88 H detection circuit 66 and the 87 H detection circuit 68 are arranged to produce negative pulses when the output of the timing controller 26 has been counted by the area counter 72 up to numbers corresponding to the periods of 88 H and 87 H respectively.

When the period of 88 H lapses after generation of the frame pulse, the 88 H detection circuit 66 produces the negative pulse as shown in FIG. 4(d). The negative pulse is supplied via an AND gate 70 to the clock terminal of the T-FF 64 and is supplied also via another AND gate 82 to the reset terminal of the area counter 72. As a result, the level of the Q output of the T-FF 64 changes to a high level. This changes the memory 42 from the writing state over to a reading state. Both the inputs of the AND gate 62 become high levels to shift the connecting position of the switch 14 to the other side M thereof. Then, an adequate video signal which is previously reproduced is produced from the memory 42. When the level of the Q output of the T-FF 64 becomes high, the 87 H detection circuit 68 this time becomes operative while the 88 H detection circuit 67 becomes inoperative. Following this, when reading is performed for a period of 87 H, a negative pulse is included in the output of the 87 H detection circuit 68, which is as shown in FIG. 4(e). This negative pulse is supplied via an AND gate 70 to the clock terminal of the T-FF 64 and is supplied via the AND gate 70 and an AND gate 82 to the reset terminal of the area counter 72 respectively.

This brings the level of the Q output of the T-FF 64 back to a low level to cause the memory 42 to resume the writing state. The connecting position of the switch 14 is shifted to the side N. After that, when an 88 H portion of the video signal is written into the memory 42, the 88 H detection circuit 66 produces a negative pulse. Then, a 263 H detection circuit 48 which is arranged to produce a negative pulse when addresses for 263 H are counted by the address counter 46 produces the negative pulse as shown in FIG. 4(f). This causes the address counter 46 to be reset.

In this manner, when the period of 263 H lapses after the frame pulse is produced, both the address counter 46 and the area counter 72 are reset and the output level of the T-FF 64 becomes high. After that, when the reading for 87 H, writing for 88 H and reading for 87 H are likewise performed, the frame pulse is produced from the OR gate 34 to bring the VTR back to its initial state. Further, in this instance, writing for the first one H of the 88 H writing is performed at one and the same address as that of the last one H of the 88 H writing performed immediately after the above stated frame pulse. However, writing is accomplished for all the addresses within the period defined by the frame pulse. With a high speed search carried out by repeating the above stated operation for every period of 525 H (one frame period), the embodiment gives excellently reproduced pictures.

Further, the foregoing description of the embodiment has described only a case where the tape speed is set at a speed four times as high as the recording tape speed. However, the embodiment is capable of giving the same advantageous effect with the tape allowed to travel at different speeds. For example, in the case of a tape speed six times as high as the recording tape speed, the same advantageous effect is attainable by setting the writing period at 53 H and the reading period at 52 H. In the event of a tape speed eight times as high as the recording tape speed, reproduction also can be adequately accomplished by setting the writing and reading periods at 38 H and 37 H respectively. Further, the high speed search can be accomplished with a memory also at tape speeds other than the above stated speeds which are even number times as high as the recording speed. In accordance with the invented arrangement, such a high speed search is possible as long as the tape is not allowed to travel at a speed which is an odd number time as high as the recording speed. For example, in the event of a 4.5 times high speed search, the writing period is set at 76 and the reading speed at 74 H and the address resetting is performed alternately at an interval of 263 H and at an interval of 262 H in such a way as to have one cycle completed by four fields.

Another example of the data writing/reading arrangement for the memory 42 according to the invention is as described below with reference to FIGS. 6 to 8:

In the case of this embodiment, the color video signal sampling frequency is arranged to be 3 fsc (fsc: color subcarrier frequency). FIG. 6 shows a modification example relative to the essential parts of FIG. 3. FIG. 7 shows by way of example the details of a timing controller 126 shown in FIG. 6. FIG. 8 is a timing chart showing the operations of various parts of FIG. 6. The same components as those shown in FIG. 3 are indicated by the same reference numerals.

Figure 6:
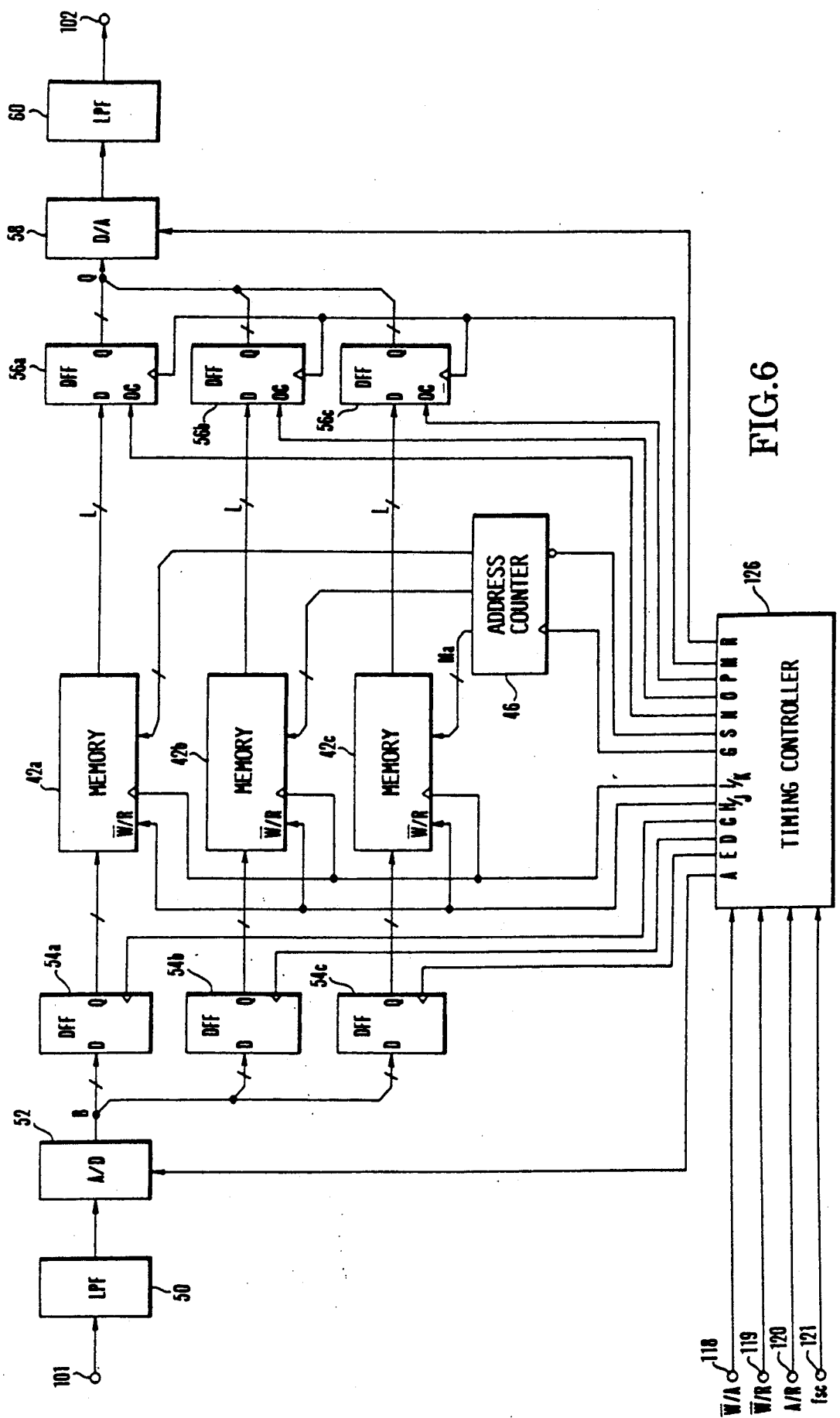
FIG. 6 is a diagram showing another example of arrangement of a memory writing/reading part shown in FIG. 3.
Figure 7:
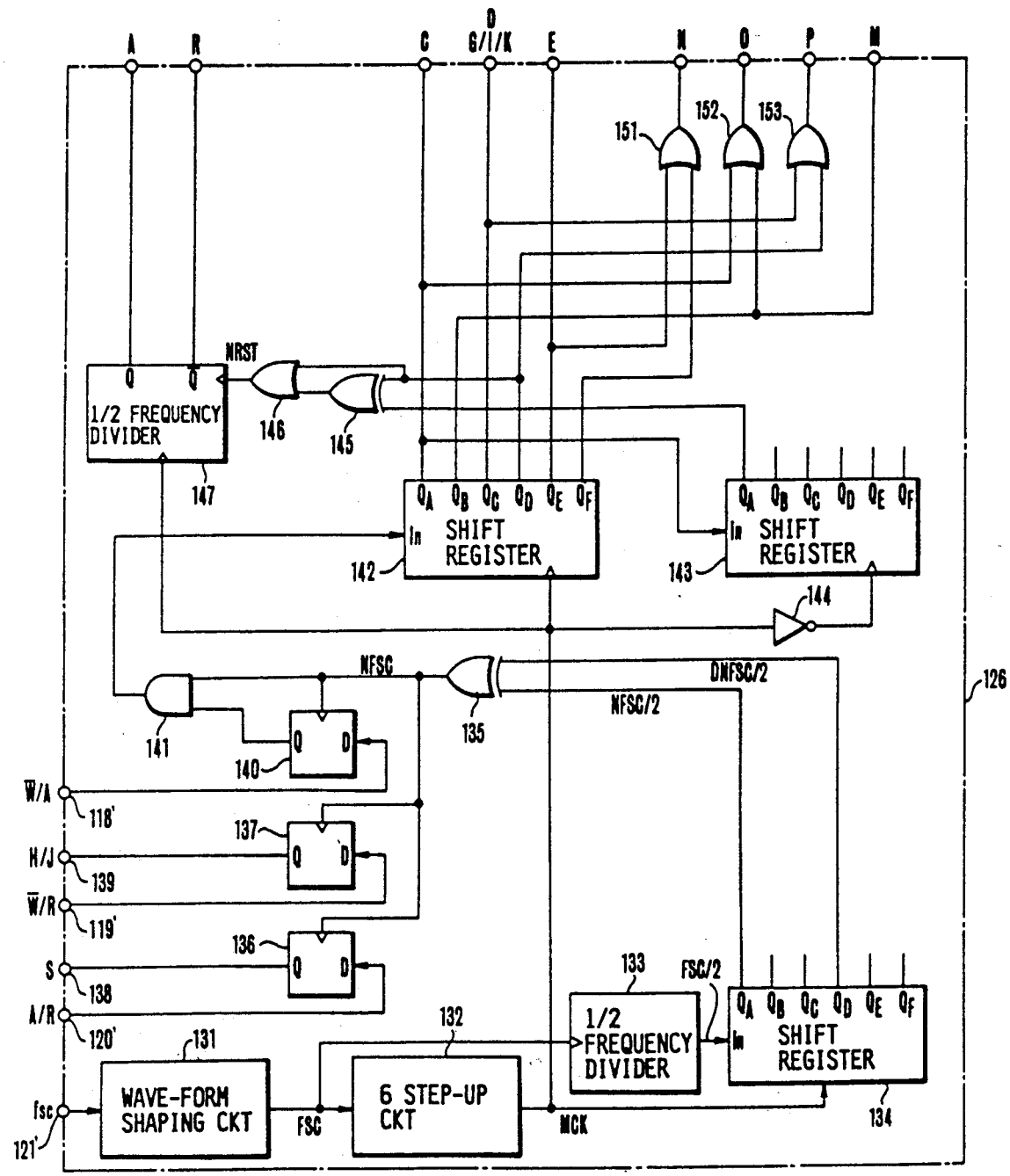
FIG. 7 is a diagram showing by way of example the arrangement of a timing controller shown in FIG. 6.

Referring to FIG. 6, a terminal 101 is arranged to receive a composite color video signal. A low-pass filter (LPF) 50 is arranged to limit the frequency band of the video signal received via the terminal 101. An analog-to-digital (A/D) converter 52 is arranged to sample the video signal which has been band-limited by the LPF 50 and to convert the sampled video signal into a digital signal. D-type flip-flops (D-FFs) 54a, 54b and 54c are arranged to take in data produced from the A/D converter 52 at different points of time. Memories 42a, 42b and 42c are arranged to store the data produced from the D-FFs 54a, 54b and 54c, respectively. D-FFs 56a, 56b and 56c are arranged to produce data at different phases. Each of the D-FFs 56a, 56b and 56c has an output control terminal OC. When the terminals OC have high level inputs, the Q output terminals of these D-FFs 56a, 56b and 56c assume a high impedance state. When they have low level inputs, they are enabled to produce data thereby. A digital-to-analog (D/A) converter 58 is arranged to convert at an operation frequency of 3 fsc the digital signal produced from the D-FFs 56a, 56b and 56c into an analog signal. The analog signal thus produced from the D/A converter 58 is supplied to an LPF 60 to have its band limited there. The band-limited analog signal is then produced from an output terminal 102 to be supplied to a TV receiver or the like which is not shown.

Compared with an audio signal, etc., a video signal carries a greater amount of information and thus necessitates use of a memory of a large storage capacity. In view of this, a dynamic random access memory (hereinafter referred to as DRAM) which permits a high degree of integration and thus can be prepared to have a large capacity is often employed as the memory for a video signal. However, the DRAM requires a long period of time for writing and reading. Therefore, with the DRAM employed, it is hardly possible to write in and read out color video signal in the form of the digital data to which it has been converted. For example, the period of time required for writing or reading data with the DRAM which is currently used for general purposes is at least 200 nsec. This is longer than the sampling period which is about 93.2 nsec in the frequency 3 fsc which is considered as a lowest necessary frequency for digitizing an NTSC composite TV signal. The DRAM, therefore, cannot be used for writing and reading at the above stated sampling period. In view of this, the embodiment uses a plurality of memories by arranging them to operate in parallel in such a way as to lengthen the periods of writing and reading data into and from each of the memories.

An address counter 46 is arranged to control the writing and reading addresses of these memories and to have its operation timing determined by a timing controller 126 in a manner as will be described in detail later. A terminal 118 is arranged to receive a signal $\overline{W}/A$ which is at a high level when a system controller which is not shown is used for the operation of the system and at a low level when the system controller is not used. A terminal 119 is arranged to receive a signal $\overline{W}/R$ which is at a high level when an instruction for writing into the memory is produced from the system controller and at a low level when the system controller instructs for reading. A terminal 120 is arranged to receive a signal A/R which indicates address resetting timing, for example, for a vertical synchronizing signal, etc. included in the video signal received at the terminal 101. A terminal 121 is arranged to receive a continuous wave signal fsc which is phase-locked to the color burst signal of a carrier chrominance signal included in the video signal received at the terminal 101. In other words, the continuous wave signal received at the terminal 121 is phase-locked to the color subcarrier of the carrier chrominance signal included in the video signal received at the terminal 101.

The operation of the timing controller 126 which is arranged to control the operation timing of each of the various parts of this embodiment is described with reference to FIGS. 7 and 8 as follows. The above stated continuous signal which is received at a terminal 121' is supplied to a wave-form shaping circuit 131 to be shaped into a rectangular wave signal FSC as shown in FIG. 8. The rectangular wave signal FSC is supplied to a step-up circuit 132 to be stepped up by six times and made into a master clock signal MCK (see FIG. 8) for the system. Further, the rectangular wave signal FSC is supplied also to a ½ frequency-divider 133 to be frequency divided to obtain a signal FSC/2 of a frequency which is ½ of the frequency fsc. The signal FSC/2 is supplied to a shift register 134. The shift register 134 is arranged to be driven by the master clock signal MCK. The QA output NFSC/2 and the QD output DNFSC/2 (see FIG. 8) of the shift register 134 are supplied to an exclusive OR circuit (EXOR) 135. The output signal NFSC of the EXOR 135 is caused to have its duty at "50" by the master clock signal MCK. In this system, this signal NFSC serves as a reference signal NFSC for the frequency fsc. In writing data into the memory, the reference signal NFSC is constantly in a given phase relation to the master clock signal MCK and the carrier chrominance signal which is included in the video signal supplied to the terminal 101. All the operation timing control signals for the various parts of the system are obtained through logical computing operations performed on this reference signal NFSC and the master clock signal MCK.

D-FFs 136 and 137 are arranged to synchronize with the reference signal NFSC the address reset control signal A/R which is supplied to a terminal 120' for resetting the addresses of the memories and the writing/reading control signal $\overline{W}/R$ which is supplied to a terminal 119', and are arranged to cause them to be produced from the terminals 138 and 139 as the outputs S and H/J of the timing controller 126 respectively. The memory address reset control signal S which is produced from the timing controller 126 is supplied to the address counter 46 as a reset signal. The writing and reading control signal H/J is supplied to the memories 42a, 42b and 42c as a writing/reading switching signal respectively.

The system operation control signal $\overline{W}/A$ which is received at a terminal 118' is supplied to a D-FF 140. The D-FF 140 produces this control signal in synchronism with the reference signal NFSC. The signal produced from the D-FF 140 causes the reference signal NFSC to be gated by an AND gate 141 and to be supplied to a shift register 142. The shift register 142 is arranged to be driven by the master clock signal MCK to produce a reference signal which has its phase shifted from the period of the color subcarrier to a degree of 1/6 thereof. A shift register 143 is arranged to receive the QA output of the shift register 142 and is driven by a signal obtained by inverting the master clock signal MCK by means of an inverter 144.

The master clock signal MCK is supplied to a ½ frequency divider 147. The frequency divider 147 produces from its Q output terminal a driving signal A for driving the A/D converter 52 and from its $\overline{Q}$ output terminal a driving signal R for driving the D/A converter 58. These driving signals A and R have a frequency 3 fsc respectively. However, if they are allowed to operate independently as they are, their operation timing cannot be correlated with the phase of the color subcarrier. In view of this, this embodiment is arranged to reset the ½ frequency divider 147 by means of a signal which is in a given phasic relation to the reference signal NFSC in such a way as to have the operation timing of the A/D converter 52 and the D/A converter 58 in a given phasic relation to the color subcarrier. More specifically, the QD output of the shift register 142 and the QA output of the shift register 143 are supplied to an EXOR 145. The output of the EXOR 145 and the QD output of the shift register 142 are supplied to an OR gate 146 to obtain a logical sum of them. By this, a reset signal NRST is obtained as shown in FIG. 8.

Figure 8:
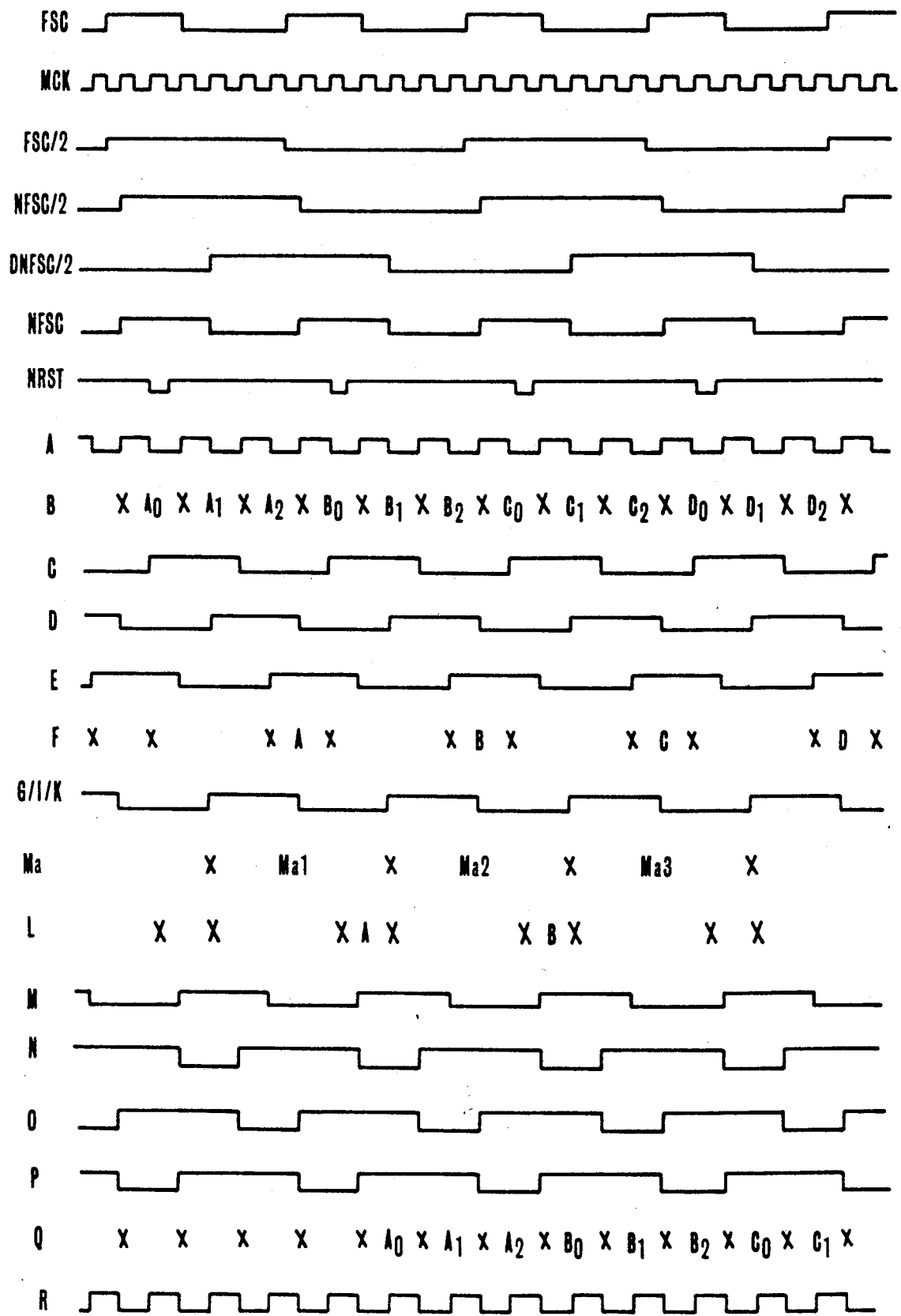
FIG. 8 is a timing chart showing the operations of various parts of FIGS. 6 and 7.

FIG. 8 schematically shows a driving signal A for the A/D converter 52; a digital signal B produced from the A/D converter 52; and the clock signals C, D and E which are produced from the QA, QC and QE output terminals of the shift register 142 for the DFFs 54a, 54b and 54c. The data outputs of these D-FFs 54a, 54b and 54c are written into the memories 42a, 42b and 42c at a timing F shown in FIG. 8 according to a signal I (see FIG. 8) which is the QC output of the shift register 142.

In accordance with the arrangement described, the data to be written into these memories 42a, 42b and 42c are extracted at different points of time which differ to a degree of ⅓ of the period of the color subcarrier from each other and are in a given phasic relation to the color subcarrier. Therefore, the phase of data written into each of the memories 42a, 42b and 42c is always in a given phasic relation with the color subcarrier.

The QC output of the shift register 142 is supplied also to an address counter 46 as a pulse G to be counted by the counter 46. The address counter 46 is arranged to renew the address at a timing Ma which is shown in FIG. 8.

A data reading operation on the memories 42a, 42b and 42c is as follows: The terminal 121' is assumed to have received the reference signal for the color subcarrier frequency fsc. When the H/J output of the timing controller 126 is at a high level, the memories 42a, 42b and 42c allow their data to be read out at a timing M shown in FIG. 8 according to a signal K which is produced from the QC output terminal of the shift register 142. The data read out is supplied to the Q terminals of the D-FFs 56a, 56b and 56c respectively.

Meanwhile, the output control terminals OC of the D-FFs 56a, 56b and 56c receive the output signals N, O and P of OR gates 151, 152 and 153. The D-FFs 56a, 56b and 56c produce data latched according to the signal M which is the QB output of the shift register 142 only when these signals N, 0 and P are at low levels. Further, the shift register 142 is supplying its QE and QF outputs to the OR gate 151; its QA and QB outputs to the OR gate 152; and its QC and QD outputs to the OR gate 153. Therefore, the data input timing for the D/A converter 58 becomes as shown at a part Q of FIG. 8. The data is thus converted into an analog signal by the D/A converter 58.

With the signal processing apparatus arranged as described above, the sampling timing for data to be written into each of the memories is in a specific preset phasic relation to the color subcarrier. This phasic relation ensures that a color video signal having adequate continuity in the color subcarrier thereof by just reading out data from these memories in rotation in a given order even in case that the continuity of the color subcarrier has been impaired.

While the embodiment described is arranged to have the frequency of sampling the color video signal at 3 fsc, this may be changed to a higher frequency such as 4 fsc or the like. In that event, the number of memories to be used must be increased accordingly.

What is claimed is:

1. A video signal processing apparatus comprising:
(a) A memory capable of storing one field portion of a video signal which has one field composed of $(i+\frac{1}{2})$ horizontal scanning periods, said i being an integer; and
(b) switching means for setting said memory alternately into a writing state and a reading state in a cycle which is shorter than one field period,
a period of time for having said memory in the writing state being at a length longer than $(i+1)/k$ horizontal scanning periods and being an integer times as long as the horizontal scanning period,
a period of time for having said memory in the reading state being at a length shorter than i/k horizontal scanning periods and being an integer times as long as the horizontal scanning periods, said k being an odd number.

2. An apparatus according to claim 1, further comprising address control means for controlling writing and reading addresses of said memory, said address control means including an address counter which is arranged to be reset once per one field period.

3. An apparatus according to claim 2, wherein said address counter is arranged to be reset alternately at an interval of i horizontal scanning periods and at an interval of (i+1) horizontal scanning periods.

4. A video signal processing apparatus comprising:
(a) A memory capable of storing one field portion of a video signal which has one field period composed of $(i+\frac{1}{2})$ horizontal scanning periods, said i being integer; and
(b) switching means for setting said memory alternately into a writing state and a no-writing state in a cycle which is shorter than one field period,
a period of time for having said memory in the writing state being at a length longer than $(i+1)/k$ horizontal scanning periods and being an integer times as long as the horizontal scanning period,
a period of time for having said memory in the no-writing state being at a length shorter than i/k horizontal scanning periods and being an integer times as long as the horizontal scanning period, said k being an odd number.

5. A video signal processing apparatus comprising:
(a) a reproducing head arranged to reproduce a video signal from a tape-shaped recording medium which has the video signal received in many tracks formed in parallel;
(b) transporting means for transporting said tape-shaped recording medium, said transporting means having a first mode in which said recording medium is transported to have said reproducing head trace said recording medium in parallel to said tracks and a second mode in which said recording medium is transported to have said reproducing head traverse one of said many tracks in a predetermined period;
(c) a memory capable of storing one field portion of said video signal; and
(d) switching means for setting said memory alternately into a writing state and a no-writing state in a cycle which is shorter than one field period,
a period of time for having said memory in the writing state being at a length longer than said predetermined period and being an integer times as long as the horizontal scanning period.
a period of time for having said memory in the no-writing state being at a length shorter than said predetermined period and being an integer times as long as the horizontal scanning period.

6. An apparatus according to claim 5, wherein said many tracks on said recording medium are formed in such a manner that adjacent tracks among them are magnetized in different directions from each other.

7. An apparatus according to claim 5, wherein said transporting means transports said tape-shaped recording medium in said second mode at a speed (k+1) times as fast as in said first mode, said k being an odd number.

8. An apparatus according to claim 7, wherein said video signal has one field composed of $(i+\frac{1}{2})$ horizontal scanning periods, and wherein said switching means is arranged to set the period of time for having said memory in the writing state at a length longer than $(i+1)/k$ horizontal scanning periods and to set the period of time for having said memory the no-writing state at a length shorter than (i/k) (horizontal scanning periods.

9. An apparatus according to claim 8, further comprising address control means for controlling writing and reading addresses of said memory, said address control means including an address counter which is arranged to be reset alternately at an interval of i horizontal scanning periods and at an interval of (i+1) horizontal scanning periods.

* * * * *